June 21, 1938.  C. HELD  2,121,348
MEAT SLICING MACHINE
Filed Jan. 6, 1932   2 Sheets-Sheet 1
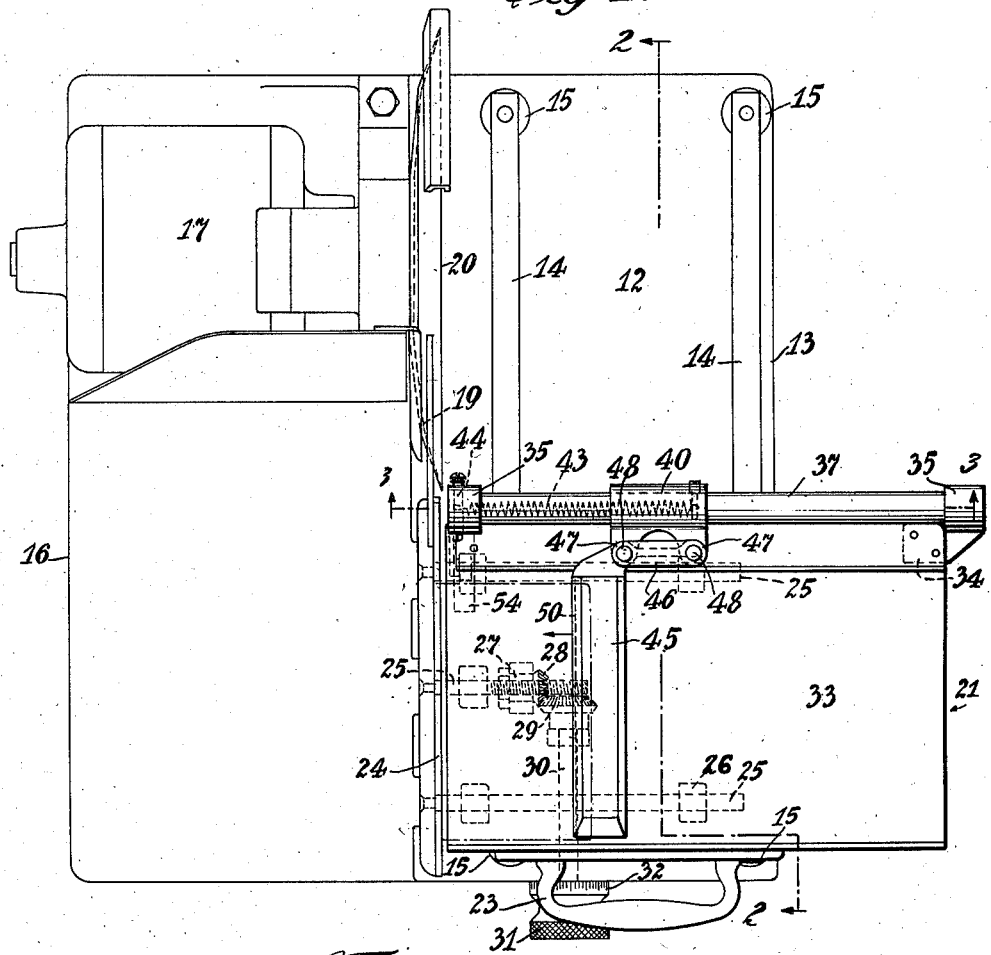
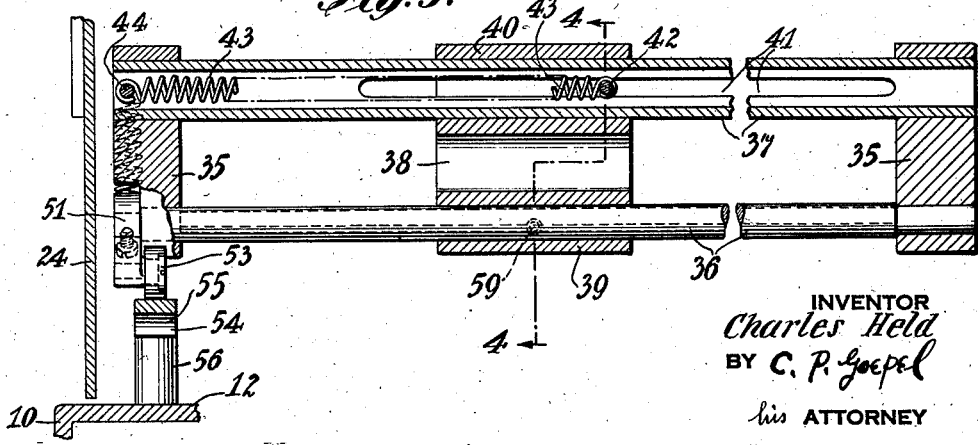
INVENTOR
Charles Held
BY C. P. Goepel
his ATTORNEY June 21, 1938.   C. HELD   2,121,348
MEAT SLICING MACHINE
Filed Jan. 6, 1932   2 Sheets-Sheet 2
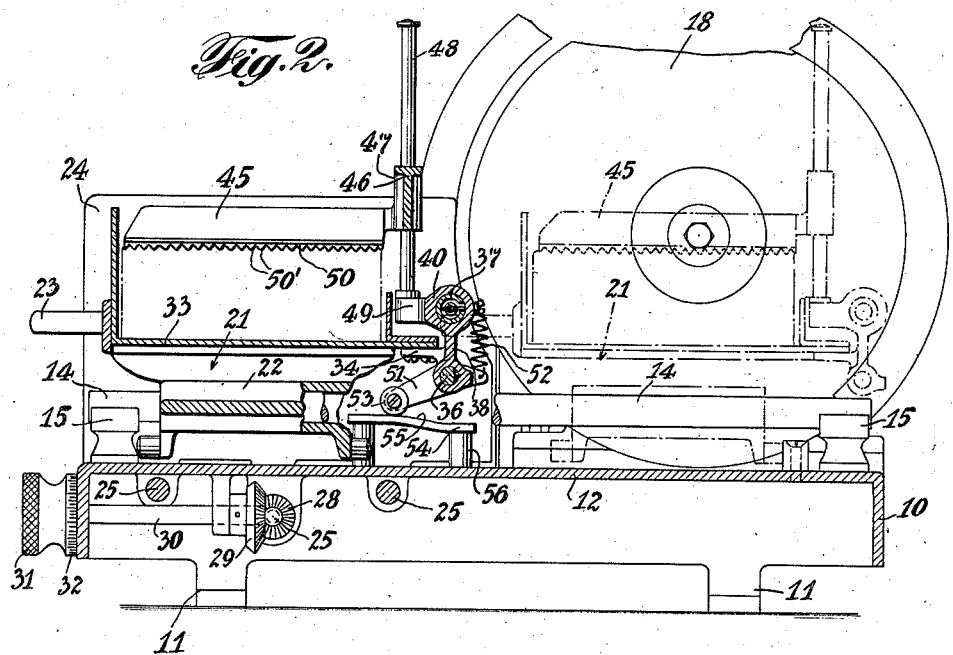
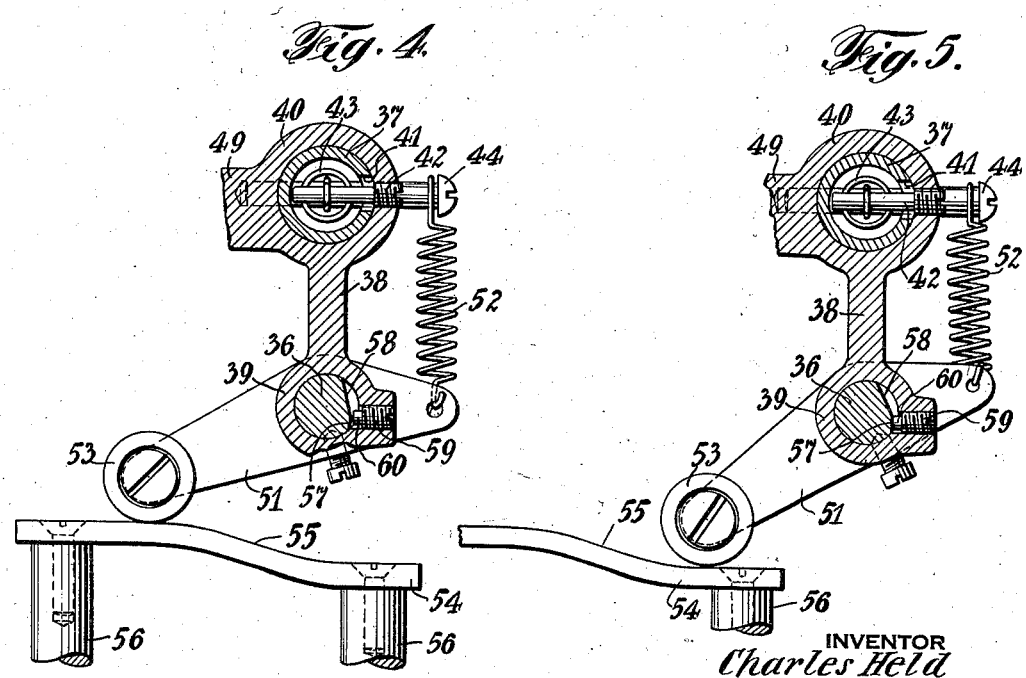
INVENTOR
Charles Held
BY
C. R. Joepel
his ATTORNEY Patented June 21, 1938

2,121,348

UNITED STATES PATENT OFFICE 2,121,348

MEAT SLICING MACHINE

Charles Held, New York, N. Y., assignor, by mesne assignments, to U. S. Slicing Machine Company, La Porte, Ind., a corporation of Indiana Application January 6, 1932, Serial No. 584,917

25 Claims. (Cl. 146—102)

This invention relates to machines for slicing meat, its general object being to provide a simplified machine of this character which will be efficient in use and very economical in manufacture.

One object and purpose of the invention is the provision of a simplified and improved construction of means whereby meat slices of various thicknesses can be accurately and rapidly cut from a meat body.

Another object of the invention is to provide in connection with the reciprocatory sliding carriage whereon the meat body is supported for movement to and from the slicing knife, a novel feeding mechanism whereby the meat body, for the severance of each slice therefrom, will be automatically moved upon the carriage and locked thereon in the particular position which it is to occupy during the slicing operation.

Another object of the invention is to provide in conjunction with an adjustable gauge plate and a slicing knife, a feed mechanism which will, for each slicing operation, automatically and forcibly move the meat body against the gauge plate, and to combine with the feed mechanism novel means whereby automatically to lock or clamp the feed mechanism in that particular position in which the meat body engages the gauge plate. The meat body is thus automatically positioned and clamped upon the sliding carriage during the sliding movement thereof, and between the severance of successive slices my improvements automatically function, first to unlock or unclamp the feed mechanism, then to actuate the feed mechanism so as to position the meat body anew, and then to relock or reclamp the feed mechanism.

An object of this invention is to provide for the feed mechanism a simple friction lock or clamp, composed of few mechanical parts, inexpensive to manufacture and easy to assemble. Other objects and advantages will appear hereinafter.

The invention is usefully and successfully employed, for example, in connection with a slicing machine of the general construction illustrated in the accompanying drawings, although it will be recognized that other modes of applying the principle of the invention may be employed instead of the particular construction in connection with which the invention is herein illustrated and explained.

With the foregoing objects in view, the invention consists in the construction and relative arrangement of parts so combined as to coact and cooperate with each other in the performance of the functions and the accomplishment of the results herein contemplated, and comprises in its evolvement the simple and practical example illustrated in the accompanying drawings, wherein similar reference characters designate corresponding parts throughout the several views, and in which:

Figure 1 represents a top plan view of a slicing machine embodying the invention;

Fig. 2 is a longitudinal section and elevation, taken approximately on the line 2—2 of Fig. 1, looking in the direction of the arrows associated with said line;

Fig. 3 represents a fragmentary transverse sectional view, taken on the line 3—3 of Fig. 1;

Fig. 4 is a cross section taken on the line 4—4 of Fig. 3, showing the feed mechanism unlocked for feeding operation; and Fig. 5 is a view similar to Fig. 4, but showing the parts of the feed mechanism in the relative positions which they occupy when in locked condition.

Referring now to the accompanying drawings, the slicing machine in which I have shown a simple and practical example of my invention as reduced to practice, comprises a base or bed-plate 10 of elongated rectangular form and this is furnished with suitable foot members 11 whereby to be placed upon a counter or table. This base is made with a flat top or table 12 and arranged lengthwise upon the top adjacent the longitudinal side 13 thereof are two spaced apart cylindrically shaped rails or bars 14. Suitable pillar blocks 15 support the rails at an elevation above the top, these pillar blocks supporting the rails adjacent the opposite ends thereof so that the rails between their opposite ends will be free and clear for the operation of a sliding carriage to be presently described.

Mounted upon the top in any suitable manner near the front end thereof and adjacent the side 16, is an electric motor 17 which operates a rotary slicing knife 18. The motor and slicing knife are arranged, as shown in Fig. 1, so that the plane of rotation of the knife will be parallel with the rails 14. The slicing knife may be carried directly by the motor driving shaft or it may be operated therefrom in any suitable or approved manner. The side of the slicing knife which faces the rails is of concaved form as shown at 19 so as to provide a rim cutting edge 20 inside of which there will be no surface for making frictional engagement with the meat body from which the slices are cut.

21 denotes the sliding carriage which is of elongated rectangular form and which is mounted upon the rails with its lengthwise dimension extending at right angles to the direction of its travel upon the rails. For reciprocation upon the rails, the sliding carriage is provided underneath with sleeve-like bearings 22 which have sliding fit on the rails, these bearings, as best shown in Fig. 2, being of less lengthwise extent than the width dimension of the carriage. The sliding carriage is furnished at its front end with a handle 23 whereby manually to move the sliding carriage upon the rails to and from that position in which the slicing knife will sever the slices from a meat body, that is clamped upon the carriage.

24 denotes a gauge or stop plate vertically disposed upon the top of the base in plan with the slicing knife. This gauge plate is mounted for adjustment transversely of the top and in respect of the cutting edge 20 of the knife so as to determine in a manner well understood in the art the thickness of the slice to be cut from the meat body. For its adjustment, the gauge plate may be mounted in any suitable or approved manner; and in the present instance the means whereby to effect the adjustment of this plate consists in providing the plate with suitable rod members 25 slidable in bearing parts 26 arranged underneath the top 12, as best shown in Fig. 2. One of the rods 25 is furnished with an adjustable nut 27 carrying a bevel gear 28 in mesh with a bevel gear 29 fixed to an operating spindle 30 operatively mounted in suitable bearings underneath the top 12. Said spindle 30 protrudes beyond the front end of the base where it is provided with a finger-knob 31 furnished with suitable scale markings 32 adapted to cooperate with a finger or index (not shown), in order accurately to determine the degree or extent of adjustment to be given to the plate 24 for producing slices of a predetermined thickness.

For containing the meat body from which the slices are to be cut, I secure upon the sliding carriage a suitable pan or receptacle 33 to the rear corners of which are fixed brackets 34 having vertically extending uprights 35. Mounted in and between the two uprights 35 is a rock shaft 36 and a tubular guide shaft 37, the last-named being mounted above and in spaced relation to the rock shaft. These two shafts, 36 and 37, are thus mounted in a plane at right angles to the plane of the gauge plate 24; and mounted upon said shafts 36 and 37, for sliding movement thereon toward and away from the gauge plate 24, is a meat body feed mechanism including a vertically extending casting or plate 38 formed with lower and upper bearing portions 39 and 40 which are sleeved for sliding movement upon said shafts 36 and 37, respectively. The tubular shaft 37 is provided with a lengthwise extending guide slot 41 transversely through which extends a pin 42 which is fixed to the upper bearing 40, as for instance, by being screw-threaded therein (Figs. 4 and 5). Attached to the inner end of this pin inside the hollow of the shaft 37 is one end of a coil spring 43, the opposite end of which is attached to a screw pin 44 screw-threaded into the shaft 37 at the inner end thereof adjacent to the gauge plate (Fig. 3). This spring normally urges the feed plate 38 toward the gauge plate 24, but in a manner that will be readily understood, it is expansible in order to permit the feed plate 38 to be moved along the shafts 36 and 37 in a direction away from said gauge plate.

According to my invention the meat body, which is placed in the pan 33, is normally urged towards the gauge plate by the feed plate 38; and the construction of means by which to cause the meat body within the pan to move with the feed plate 38 toward the gauge plate consists in the provision of a vertically adjustable clamping mechanism comprising a holding device 45 which extends across the open top of the pan in a plane substantially parallel with the plane of the gauge plate and this holding device is provided at its rear end with an angular portion 46 having two spaced apart vertically extending bearings 47 mounted for vertical sliding movement upon vertically extending pins 48. As best shown in Fig. 2, the pins 48 are secured at their lower ends to a forwardly extending shelf or ledge 49 formed on the upper bearing of the feed plate 38. The holding device 45, where it extends across the interior of the pan 33 is provided with a meat body gripping blade 50 having depending teeth or splines 50' adapted to embed themselves in the meat body when the holding device 45 is lowered to the meat body as the latter reposes in the pan. It will be evident that the holding device 45 with its meat body gripper will be elevated and lowered correspondingly with the movement upwardly and downwardly of the connected bearings 47 upon the vertical pins 48. It will be equally evident that the holding device, thus mounted for adjustment on the vertical pins will be moved with the movement of the feed plate 38. As best shown in Fig. 1, the horizontal holding device 45 is preferably made with a flat relatively broad top, whereon the hand or arm of the operator may be placed or rested in order conveniently to force the device downwardly when it is desired to embed the teeth or splines of the gripper in the meat body and to properly maintain them therein. By this arrangement, the meat body is clamped by the holding device so that as the feed mechanism moves toward the gauge plate, the meat body will be moved with the feed mechanism until it forcibly contacts against the gauge plate and in such position that when the sliding carriage is moved rearwardly upon the rails 14 the slicing knife 20 will cut a slice from the meat body.

The shaft 36 has rocking movement within the lower bearing 39 and its opposite ends have rocking fit in the uprights 35. Adjacent the gauge plate, the end of the shaft 36 is provided with a lever 51 whereby to be rocked. A pull spring 52 connects the rear end of this lever with the pin 44, while the front end of this lever carries a roller 53 which is adapted to turn on a rail 54 having an inclined course 55 between its ends, the said rail extending longitudinally of the base and being mounted upon posts 56 which extend upwardly therefrom. The pull spring 52 urges the lever 51 and hence the shaft 36 in that position in which the roller 53 will turn on the rail 54. Said rock shaft 36, as clearly shown in Figs. 4 and 5, is cut away in a lengthwise direction so as to provide angular faces 57 and 58. Screw-threaded into the lower bearing 39 of the feed plate 38 is a screw pin 59 having an inner friction end 60 adapted, when the rock shaft is in the position shown in Fig. 5, to frictionally engage the angular face 57, and also adapted, when the rock shaft is in the position shown in Fig. 4, to escape engagement with the angular face 58. Now, the position of the rail 54 with respect to the slicing knife is such, as best shown in Fig. 2, that momentarily prior to the commencement of the slicing operation, the roller 53 will have completed its descent of the inclination 55, permitting the pull spring to move the rock shaft into that position in which it will be frictionally engaged and locked by the pin 59. This operation occurs automatically and during the movement of the sliding carriage rearwardly for the engagement of the meat body with the slicing knife. On each return movement of the sliding carriage, that is to say, after the completion of the slicing operation, the roller 53 in traveling up the incline 55 swings the lever 51 and hence the rock shaft 36 in that direction in which the end of the friction screw 59 escapes the angular face 57, thereby releasing the feed mechanism and permitting the spring 43 to come into action for moving the feed mechanism toward the gauge plate so as to again forcibly bring the meat body into contact with the gauge plate preparatory to cutting off the next slice. It will be recognized that through the frictional locking of the rock shaft, the feed mechanism will be held in the precise position it occupies when the meat body or other material firmly contacts the gauge plate. This precision locking operation takes place without any variation in the position of the feed mechanism, such, for example, as takes place in the use of a pawl and ratchet mechanism in which there is always a lost-motion effect due to the play of the pawl point on or between the ratchet teeth. It will also be recognized that in the present invention the precision locking operation is maintained not only during the slicing stroke but also during the return stroke of the carriage and that this arrangement prevents any relative movement of the feed mechanism with the result that there is no smearing of the knife by the meat body or other material during the return stroke, as the material is positively maintained in spaced relation to the knife a distance equal to the thickness of the severed slice. Since the knife cannot be smeared with the material during the return stroke, it follows that when different kinds of material are successively cut in the machine, the knife cannot transfer smears or fragments of one kind of material which has been cut to another kind of material which is to be cut.

From the foregoing, it will be seen that the invention herein disclosed evidences in its simplest form a rock shaft or equivalent mechanical device by means of which to lock the meat body feed mechanism before, and to release it after, each splicing operation. It will also be noted that the device of the present invention is exceedingly simple, composed of few parts, inexpensive to manufacture, and easy to assemble. Furthermore, the device is sturdy and compact, relatively light in weight for handling and shipment, and is easy and convenient to operate, besides being accurate and rapid in operation.

While the invention has been illustrated and described with some degree of particularity, it is realized that in practice various changes and alterations may be made therein, and further that the invention is capable of embodiment in many different slicing-machine constructions. It has been sought herein to illustrate only such an embodiment as will suffice to exhibit the character of the invention. Reservation is, therefore, made to the right and privilege of changing the details of construction or otherwise altering the arrangement of the parts without departing from the spirit or scope of the invention or the scope of the appended claims.

I claim:—

1. In a meat slicing machine, embodying a gauge plate, a rotary slicing knife arranged at one side of the gauge plate substantially parallel thereto and a meat carrying carriage reciprocable across the face of the gauge plate and knife, a relatively movable spring-urged feed device on the carriage normally urging the meat thereon into position to contact the gauge plate, a rock shaft on which the feed device is movable, adapted on rocking movement in one direction to lock the feed device against relative movement, and on counterrocking movement to release the feed device for movement, means for rocking the shaft to effect the locking action before the cutting of each slice, and means for counterrocking the shaft to effect the releasing action after each slicing operation.

2. In a meat slicing machine, embodying a gauge plate, a rotary slicing knife arranged at one side of the gauge plate substantially parallel thereto and a meat carrying carriage reciprocable across the face of the gauge plate and the knife for the slicing operation, a relatively movable feed device on the carriage, a clamp on the feed device for clamping the meat to move the meat with the feed device, spring means normally urging the feed device in a direction to contact the clamped meat with the gauge plate, a rock shaft for locking and releasing the feed device, rockable in one direction to lock the feed device against movement and in a counter direction to release the same for movement, means for rocking the shaft to effect a locking action before each slicing operation, and means for rocking the shaft in a counter direction to effect the releasing action after each slicing operation.

3. In a slicing machine which includes a knife and means for actuating it, a gauge plate, a carriage and means for guiding the carriage across the face of gauge plate and past the cutting edge of the knife, a feeder mounted on said carriage and normally movable toward the cutting plane, means tending normally to move the feeder toward the cutting plane, self-setting friction brake means tending normally to resist such movement whereby to reduce friction between the knife and gauge plate and the work piece during the return movement of the carriage, and means for manually rendering said brake means inoperative to permit the feeder moving means to advance the feeder at the beginning of a forward movement of the carriage said brake means being effective at a wide range of positions of the feeder.

4. In a slicing machine including a carriage reciprocable at one side of a slicing knife and a gauge plate which provides therewith a cutting plane for the slicing operation, a relatively movable feed device on the carriage, spring means normally urging the feed device toward the cutting plane, a clamp on the feed device for clamping the work-piece to move with the feed device, a rock shaft on the carriage having locking and releasing segments cooperating with the feed device for locking and releasing the latter, said shaft being rockable in one direction to engage its locking segment with the feed device and thereby lock the latter whereby to reduce friction between the knife and gauge plate and the work-piece during the return stroke of the carriage, and in a counter direction to bring its releasing segment into position to release the feed device at or near the return position of the carriage, and means for rocking said shaft.

5. In a slicing machine including a carriage reciprocable at one side of a slicing knife and a gauge plate which provides therewith a cutting plane for the slicing operation, a relatively movable work-piece feed device on the carriage normally spring-urged toward the cutting plane, a rock shaft on the carriage along which the feed device is movable and having locking and releasing segments, a braking member on the feed device in relation to said segments, said shaft being rockable in one direction to engage its locking segment with the braking member and lock the feed device against movement to provide for the reciprocation of the carriage past the knife for the slicing operation and for its return, and also being rockable in a counter direction to bring its releasing segment into position to release said member whereby to release the feed device for movement toward the gauge plate at or near the return position of the carriage, and means for rocking said shaft.

6. A slicing machine including, with a carriage mounted for reciprocation along the faces of a slicing knife and gauge plate which provides therewith a cutting plane for the slicing operation, a transversely movable work-piece moving mechanism on the carriage having means normally urging it toward the cutting plane, together with means normally resisting movement of said mechanism toward the cutting plane to avoid frictional contact of the work-piece with the knife and gauge plate on the return stroke of the carriage comprising cooperating elements having braking engagement with each other and one of said elements being relatively movable and effective in one position to release the other to permit said mechanism to advance toward the gauge plate at a time in relation to the beginning of the forward stroke of the carriage.

7. In a slicing machine including a carriage mounted for reciprocation along the faces of a slicing knife and gauge plate which provides therewith a cutting plane for the slicing operation, the combination of a work-piece moving mechanism mounted on the carriage for movement transversely thereof toward and away from the cutting plane, means normally urging said mechanism toward the cutting plane, means normally resisting such movement to avoid frictional contact between the work-piece and the knife and gauge plate during the return stroke of the carriage, including cooperating friction elements disposed on the carriage and said mechanism, respectively, and having frictional braking engagement with each other, one of said elements being relatively movable and effective in one position to release the other, and means for actuating said movable friction element.

8. A slicing machine including, with a carriage mounted for reciprocation along the faces of a slicing knife and gauge plate which provides therewith a cutting plane for the slicing operation, a transversely movable work-piece moving mechanism on the carriage having means normally urging it toward the cutting plane, together with means normally resisting movement of said mechanism toward the cutting plane to avoid frictional contact of the work-piece with the knife and gauge plate on the return stroke of the carriage, comprising cooperating friction elements disposed on the carriage and said mechanism, respectively, and having frictional braking engagement with each other, one of said elements being relatively movable and effective in one position to release the other whereby to permit said mechanism to advance toward the gauge plate, and means for automatically moving said movable friction element to releasing position comprising a follower device attached thereto and a guide piece for engagement by said device located adjacent the terminal of the forward movement of the carriage.

9. A slicing machine including, with a carriage mounted for reciprocation along the faces of a slicing knife and gauge plate which provides therewith a cutting plane for the slicing operation, a transversely movable work-piece moving mechanism on the carriage having means normally urging it toward the cutting plane, together with means effective to resist movement of said mechanism toward the cutting plane to avoid frictional contact of the work-piece with the knife and gauge plate on the return stroke of the carriage, and ineffective for such resistance in relation to the terminal of the forward stroke of the carriage to allow at that time the advancement of said mechanism toward the gauge plate, said means comprising cooperating friction elements adapted, in one position of one element which is movable for the purpose, to have frictional braking engagement, and in another position of the movable element to be released from such engagement, and means for automatically operating said movable element comprising a follower carried thereby and a cam member disposed for engagement and disengagement by said follower.

10. In a slicing machine which includes a base, a knife on the base and means for actuating it, a gauge plate, a carriage and means for guiding the carriage across the face of the gauge plate and past the cutting edge of the knife, a feeder mounted on said carriage and normally movable toward the cutting plane, means tending normally to move the feeder toward the cutting plane, self-setting friction brake means tending normally to resist such movement whereby to reduce friction between the knife, gauge plate and work piece during the return movement of the carriage, and means comprising a movable member on the carriage connected with said brake means and a fixed member on the base situated in the path of movement of the member on the carriage for rendering said brake means inoperative to permit the feeder moving means to advance the feeder at the beginning of the forward movement of the carriage, said brake means being effective at a wide range of positions of the member.

11. In a slicing machine having a base, a gauge plate mounted on said base having a gauge face, a rotatable slicing knife mounted to one side of said gauge plate for rotation in a plane substantially parallel to the face of the gauge plate, a foodstuff carriage mounted for reciprocation across the face of the gauge plate and across said slicing knife, a foodstuff feeder mounted on said carriage, and a spring for resiliently urging said feeder in feeding direction toward the plane of the gauge plate; the combination of brake means for holding said feeder from movement by said spring, spring means for normally urging said brake means to braking position, and cam means for releasing said brake means, said cam means comprising cooperable members carried by said base and carriage respectively, engageable as the carriage is moved to a position adjacent the gauge plate to release said brake means.

12. In a slicing machine which includes a knife and means for actuating it, a gauge plate, a carriage and means for guiding the carriage across the face of the gauge plate and past the cutting edge of the knife, a feeder mounted on said carriage and movable toward the cutting plane, means tending to move the feeder toward the cutting plane, friction brake means operable to resist such movement whereby to reduce friction between the knife and the gauge plate and the work piece during the return movement of the carriage, and means for rendering said brake means inoperative to permit the feeder moving means to advance the feeder when the carriage is aligned with the face of the gauge plate.

13. In a slicing machine which includes a knife and means for actuating it, a gauge plate, a carriage and means for guiding the carriage across the face of the gauge plate and past the cutting edge of the knife, a feeder mounted on said carriage and movable toward the cutting plane, means tending to move the feeder toward the cutting plane, friction brake means operable to resist such movement whereby to reduce friction between the knife and the gauge plate and the work piece during the return movement of the carriage, and means for rendering said brake means inoperative to permit the feeder moving means to advance the feeder when the carriage is aligned with the face of the gauge plate, said brake means being effective at a wide range of positions of the feeder.

14. A slicing machine for foodstuffs comprising a rotatable slicing knife and means for rotating it, a gauge plate disposed to one side of said knife having its gauge face displaced from the cutting plane of the knife, a carriage mounted for reciprocation across the face of the gauge plate and past said knife, means for guiding the carriage, means for reciprocating the carriage, a foodstuff feeder mounted on said carriage for movement through a given range of feeding travel toward the cutting plane and operable to feed the foodstuff, means for resiliently urging said feeder toward the cutting plane, friction brake means operable in any position of said feeder within said range of feeding travel to lock the feeder from movement by said resilient means to prevent undue frictional drag on the foodstuff against the knife during reciprocation of the carriage past the knife, and means operable while the carriage is aligned with the gauge plate face for rendering said brake means inoperative whereby to permit said resilient means to move the feeder to engage the foodstuff against the gauge plate.

15. A slicing machine comprising a reciprocable carriage, a gauge plate, a substance feeder movable through a given range of feeding travel, means for resiliently urging the feeder toward the gauge plate, and friction brake means positioned below the substance supporting surface of the carriage operable in any position of said feeder within said range of travel for preventing the urging action of the resilient means.

16. A slicing machine comprising a reciprocable carriage, a gauge plate, a substance feeder movable through a given range of feeding travel, means for resiliently urging the feeder toward the gauge plate, means operable in any position of said feeder within said range of travel for preventing operation of said feeder by the resilient means, and means for disabling said preventing means.

17. In a slicing machine having a rotary knife and means for rotating it, a gauge plate disposed to one side of the knife, a manually reciprocable carriage movable across the face of the gauge plate and across the cutting edge of the knife, a member secured to said carriage, a substance feeder mounted upon said carriage for movement toward the cutting plane having a part slidable along said member through a given range of feeding travel, a spring for resiliently urging said feeder part toward the cutting plane, spring means for frictionally engaging said carriage member and said feeder part to lock the feeder part from movement by said first named spring, said spring means being operable at any position of said feeder part with respect to said carriage member within the range of feeding travel, and means to disable said spring means to permit the feeder part to be urged by said first spring toward the cutting plane.

18. In a slicing machine having a rotary knife and means for rotating it, a gauge plate disposed to one side of the knife, a manually reciprocable carriage movable across the face of the gauge plate and across the cutting edge of the knife, a substance feeder mounted upon said carriage for movement through a given range of feeding travel toward the cutting plane, means for resiliently urging said feeder toward the cutting plane, friction brake means operable in any position of the feeder for locking said feeder from movement by said resilient means, and means operable at each reciprocation of the carriage when the carriage is aligned with the gauge plate for temporarily disabling said brake means.

19. In a meat slicing machine including a rotary slicing knife, the combination of a gauge plate, a meat carrying carriage reciprocable across the face of the knife and gauge plate for the slicing operation, a spring urged feed mechanism on the carriage normally urging the meat thereon in a direction to contact the gauge plate, and means dependent for its operation upon the movement of the carriage for locking the feed mechanism in the particular position it occupies when the meat on the carriage contacts said plate, comprising a rock shaft on the carriage and along which the feed mechanism is slidable, said shaft having an angular face, means on the feed mechanism adapted to lock with said angular face when the shaft is rocked, a lever on said shaft, a cam abutment adapted to be engaged by said lever on the movement of the carriage to cause the rocking of said shaft, and means normally urging said lever into position to engage said cam abutment.

20. A slicing machine comprising a gauge member, a slicing knife, a substance feeder, said substance feeder and said slicing knife being relatively movable transversely whereby to bring the substance feeder alternately into alignment with the gauge member and with the slicing knife, said substance feeder being movable forward toward the gauge member and slicing knife through a given range of feeding travel, means yieldingly urging the feeder forward, means operable in any position of said feeder within said range of travel for preventing operation of said feeder by the urging means, and means for disabling said preventing means.

21. A slicing machine comprising a gauge member, a slicing knife, a substance feeder, said substance feeder and said slicing knife being relatively movable transversely whereby to bring the substance feeder alternately into alignment with the gauge member and with the slicing knife, means yieldingly urging the substance feeder longitudinally forward toward the gauge member and slicing knife, means for preventing movement of the substance feeder longitudinally forward when the feeder is aligned with the slicing knife, and means operable when the feeder is in alignment with the gauge member for disabling the preventing means.

22. A slicing machine comprising a gauge member, a slicing knife, a substance feeder, said substance feeder and said slicing knife being relatively movable transversely whereby to bring the substance feeder alternately into alignment with the gauge member and with the slicing knife, means yieldingly urging the substance feeder longitudinally forward toward the gauge member and slicing knife, means for preventing movement of the substance feeder longitudinally forward when the feeder is aligned with the slicing knife, means operable when the feeder is in alignment with the gauge member for disabling the preventing means, and means controlling said disabling means for operation in timed relation to the relative transverse movement between the substance support and the slicing knife.

23. A slicing machine comprising a base, a gauge member, a slicing knife, a carriage adapted for reciprocable movement transversely of the base into alternate alignment with the gauge member and the slicing knife, a substance feeder on the carriage movable with respect thereto, means resiliently urging the substance feeder forward toward the gauge member and the slicing knife, means for preventing movement of the substance feeder forward when the carriage is aligned with the slicing knife, and means operable when the carriage is aligned with the gauge member for disabling the preventing means, said disabling means comprising cooperative control elements on the carriage and on the base of the machine brought into engagement by the movement of the carriage.

24. A slicing machine comprising a gauge member, a slicing knife, a substance feeder, said substance feeder and said slicing knife being relatively movable transversely whereby to bring the substance feeder alternately into alignment with the gauge member and with the slicing knife, means resiliently urging the substance feeder longitudinally forward toward the gauge member and slicing knife, locking means for preventing movement of the substance feeder longitudinally forward when the feeder is aligned with the slicing knife, and means operable when the feeder is aligned with the gauge member for disabling the locking means.

25. A slicing machine comprising a gauge member, a slicing knife, a substance feeder, said substance feeder and said slicing knife being relatively movable transversely whereby to bring the substance feeder alternately into alignment with the gauge member and with the slicing knife, means resiliently urging the substance feeder longitudinally forward toward the gauge member and slicing knife, locking means for preventing movement of the substance feeder longitudinally forward when the feeder is aligned with the slicing knife, and means operable when the feeder is aligned with the gauge member for disabling the locking means, said disabling means comprising a lever and abutment brought into engagement by the relative transverse movement between the substance feeder and the slicing knife.

CHARLES HELD.